United States Patent Office 3,335,156
Patented Aug. 8, 1967

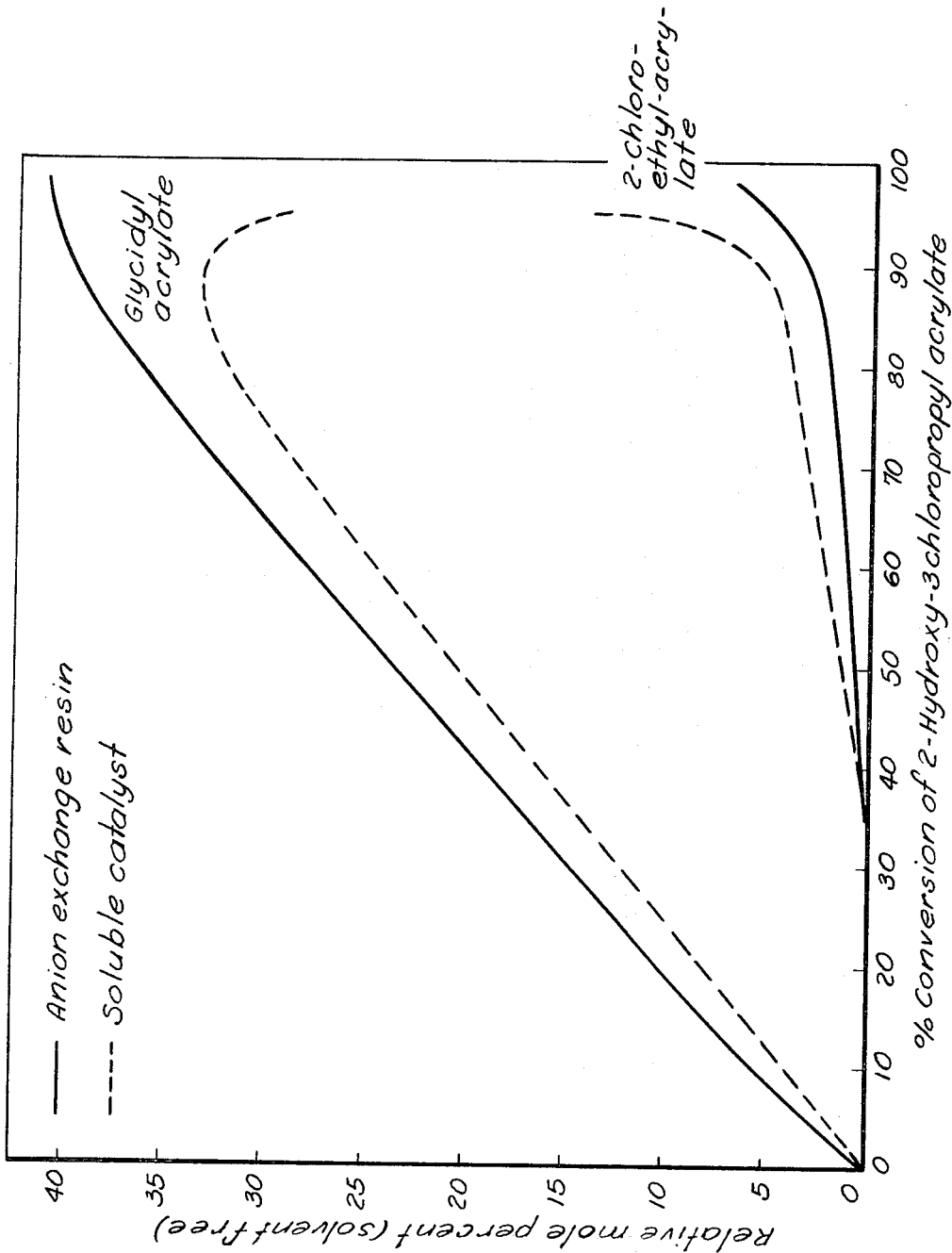

3,335,156
PROCESS FOR THE PREPARATION OF GLYCIDYL ESTERS
Douglas R. Smith, Freeport, Tex., assignor to The Dow Chemical Company, Midland, Mich., a corporation of Delaware
Filed Jan. 29, 1965, Ser. No. 428,984
13 Claims. (Cl. 260—348.6)

This invention relates to an improved process for the preparation of glycidyl esters and particularly glycidyl esters of ethylenically unsaturated monocarboxylic acids. More specifically it concerns the use of a strong-base anion-exchange resin to catalyze the conversion of a 2-hydroxy-3-chloro-propyl ester (I) into the corresponding glycidyl ester (II) by transepoxidation, i.e., by cyclization of the 2-hydroxy-3-chloro-propyl ester through transfer of HCl from the ester chlorohydrin to another epoxide as shown in Equation 1.

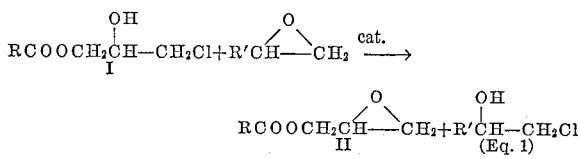

(Eq. 1)

The synthesis of a glycidyl ester by the reaction of an organic carboxylic acid with at least 2 equivalent of epichlorohydrin in the presence of a soluble tertiary amine or quaternary ammonium salt as catalyst is well known. For example, in U.S. Patent 2,772,296, Mueller and Shokal describe the condensation of excess epichlorohydrin or other lower 1-chloro-2,3-epoxyalkane with such organic acids as adipic acid, benzoic acid, methacrylic acid, succinic acid and cyclohexenecarboxylic acid. Subsequently in U.S. Patent 2,992,239, Nevin and Fletcher employed the process to prepare glycidyl esters of higher fatty acids, while June and Repean in U.S. Patent 3,075,-999 used it to prepare glycidyl esters of fatty acid dimers and trimers.

This reaction of a carboxylic acid with excess epichlorohydrin entails at least two distinct steps:

(1) Esterification of the carboxylic acid (RCOOH) by reaction with epichlorohydrin to form a 2-hydroxy-3-chloropropyl ester (I), and
(2) Cyclization or epoxidation of the 2-hydroxy-3-chloropropyl ester (I) to form the glycidyl ester (II).

Both steps are catalyzed by a soluble tertiary amine or quaternary ammonium salt. They can be carried out separately with isolation of the intermediate ester chlorohydrin or successively in the same reactor. Neutralization or removal of the HCl formed in the cyclization reaction is essential for acceptable yields. Normally a suitable base such as sodium hydroxide, potassium carbonate, or pyridine is used.

It has now been discovered that an insoluble strong-base anion-exchange resin in salt form is an improved catalyst for the cyclization of the intermediate 2-hydroxy-3-chloropropyl ester by transepoxidation. Not only is the anion-exchange resin catalyst readily adaptable to either batch or continuous processing, but its use results in higher yields and shorter reaction times. Furthermore the catalyst is readily removed from crude product prior to purification thereby increasing the stability of the glycidyl ester during the recovery process and reducing losses normally encountered in purifying the ester in the presence of dissolved catalyst.

In addition the insoluble strong-base anion-exchange resin is also a suitable catalyst for the esterification of organic carboxylic acids with epichlorohydrin. Therefore a further embodiment of the present invention is the use of the strong-base resin as a catalyst for the direct synthesis of a glycidyl ester from the corresponding carboxylic acid and excess epichlorohydrin without isolation of the intermediate 2-hydroxy-3-chloropropyl ester. Since the direct synthesis entails both the esterification and cyclization steps, the advantages of the resin catalyst in the cyclization reaction are also incorporated in the direct synthesis process.

REACTANTS

The improved process described herein can be used to prepare the glycidyl ester of numerous organic carboxylic acids, including aliphatic, aromatic and heterocyclic acids. It is particularly suitable for the synthesis of glycidyl esters of $C_1$–$C_{20}$ mono- and dicarboxylic acids such as acetic acid, propionic acid, acrylic acid, methacrylic acid, succinic acid, cyclohexanecarboxylic acid, benzoic acid, phenylacetic acid, valeric acid, oleic acid, sorbic acid, lauric acid and stearic acid. The organic acid can also be substituted with noninterfering groups such as alkoxy or ester groups. Particularly advantageous is use of the process in the synthesis of glycidyl esters of $C_3$–$C_6$ ethylenically unsaturated carboxylic acids such as glycidyl acrylate and glycidyl methacrylate.

In practice, the preferred resin catalyst for the transepoxidation reaction is a strong-base, quaternary ammonium anion-exchange resin. Particularly suitable are quaternary ammonium resins prepared by copolymerizing styrene and divinylbenzene followed by chloromethylation and amination with trimethyl amine, dimethylethanolamine or other tertiary amine, such as are described in U.S. Patents 2,591,573 and 2,614,099. Such strong-base quaternary ammonium resins are available commercially under such trademarks as Dowex 1, Dowex 2, Dowex 21K, Amberlite IRA–400, Amberlite IRA–410, and Duolite A–101.

Normally, commercial strong-base anion-exchange resins are available in the chloride form particularly suited for the present transepoxidation process. At times when the resin is used to catalyze both esterification and cyclization by transepoxidation, it is advantageous to convert the resin into the corresponding carboxylic acid salt form by conventional methods prior to use in the esterification step. Since the reactants and products are very susceptible to hydrolysis, the resin catalyst must be dry. Minor amounts of water, e.g., 1–2 weight percent based on resin, are not detrimental. Larger amounts of water must be removed by solvent extraction, azeotropic distillation or other suitable means.

The intermediate 2-hydroxy-3-chloropropyl ester required in the transepoxidation process is conveniently prepared by the resin catalyzed esterification of the corresponding carboxylic acid with epichlorohydrin. The esterification can be carried out in situ without isolation of the ester chlorohydrin, or if desired the intermediate ester can be isolated and purified prior to transepoxidation. Other methods of preparing the 2-hydroxy-3-chloropropyl ester can also be used. The resin catalyzed transepoxidation is not dependent on the process used in preparing the intermediate chlorohydrin.

Cyclization of the 2-hydroxy-3-chloropropyl esters by transepoxidation occurs through a reversible exchange reaction which results in the transfer of HCl from the ester chlorohydrin to another epoxide thereby forming the desired glycidyl ester and a new chlorohydrin (cf. Eq. 1). This transepoxidation requires a catalyst and high yields of glycidyl ester are favored by an excess of the acceptor epoxide.

Execss epichlorohydrin is itself a suitable acceptor in this transepoxidation. However, other alkyl 1,2-epoxides and particularly other $C_2$–$C_4$ alkylene oxides can be used. Often advantageous because of relatively low boiling points, are unsubstituted $C_2$–$C_4$ alkylene oxides such as ethylene oxide, propylene oxide and 1,2-butylene oxide. Not only is the excess of these lower boiling alkylene oxides more easily stripped from the product, but the by-product alkylene chlorohydrins are also often more readily removed in purifying the glycidyl ester than glycerine dichlorohydrin, the by-product formed by transepoxidation with epichlorohydrin.

REACTION CONDITIONS

To prepare glycidyl esters by direct reaction of an organic carboxylic acid with excess epichlorohydrin using a strong-base anion-exchange resin as a catalyst, it is essential to use at least two and preferably from four to twelve moles of epichlorohydrin per molar equivalent of carboxylic acid. If desired epichlorohydrin can be used in greater excess as a reaction diluent. When cyclization of the 2-hydroxy-3-chloropropyl ester by transepoxidation is carried out in a separate step, at least 1.0 mole, and preferably from 1.5 to 10 moles, of the acceptor epoxide are required per mole of ester to achieve high conversions and yields of glycidyl ester.

The amount of strong-base anion-exchange resin used as catalyst can vary widely. Generally in a batch process about 0.01 to 5.0 weight percent dry resin based on carboxylic acid or ester chlorohydrin is suitable. Preferably from 0.1 to 3.0 weight percent is used. Of course, in a column reactor, sufficient resin must be used to obtain a resin bed of suitable size for the desired feed rate and contact time.

Diluents or solvents other than the alkylene oxide reactant can be employed when required. Suitable diluents, inert under the usual reaction conditions, include such liquid hydrocarbons as benzene, toluene, cyclohexane, heptane, and various petroleum fractions. Chlorinated aliphatic solvents such as carbon tetrachloride, chloroform, 1,2-dichloroethane, 1,1,2-trichloroethane and 1,2-dichloropropane can also be used.

When a reactant or product contains unsaturated ethylenic groups susceptible to polymerization, it is often desirable to add a polymerization inhibitor to the reactant mixture. Among the suitable inhibitors are hydroquinone, 2-methyl hydroquinone, phenyl-α-naphthylamine, phenothiazine and the like. Such inhibitors are commonly employed in amounts from about 0.1 to 5.0 weight percent based on the unsaturated material.

The preparation of glycidyl esters by the resin catalyzed transepoxidation occurs readily at a temperature of 50° to 120° C. However, it has been found that above 90° to 100° C., competing reactions including transesterification occur at an appreciable rate thereby decreasing the yield of glycidyl ester and complicating the product recovery and purification. Hence a reaction temperature of 50° to 90° C. is preferred. Below 90° C., transesterification does not occur to a significant extent with the insoluble strong-base anion-exchange resin catalyst. However, with a soluble quaternary ammonium catalyst, transesterification remains a significant competing reaction at temperature below 90° C.

In a continuous process utilizing separate esterification and cyclization steps, separate resin beds are advantageous. The initial esterification with epichlorohydrin can be run at a temperature from 50° to 90° C. and higher to about 150° C. without detrimental effect. Then the intermediate ester chlorohydrin can be cyclized in another resin bed operated at 50° to 90° C., and preferably 75° to 90° C.

Normally the reactions are carried out at atmospheric pressure. However, moderate superatmospheric pressure can be used when desired.

The reaction time depends particularly on the reaction temperature, the reactant concentrations, and the amount of resin catalyst used. But in a batch process, a reaction time of about 2 to 20 hours generally gives a satisfactory conversion. When the transepoxidation is carried out in a resin column with a much higher relative amount of catalyst, a contact time of from 2 to 10 minutes is often adequate.

The glycidyl ester prepared by the improved transepoxidation reaction is recovered by conventional methods after removing the anion-exchange resin catalyst by filtration or decantation as required. Then the excess alkylene oxide and by-product alkylene chlorohydrin are stripped from the higher boiling glycidyl ester by distillation, extraction or other conventional methods. The glycidyl ester is then isolated and purified by distillation, crystallization or other suitable means.

The following examples illustrate further the invention described herein, but are not to be construed as limiting in scope. Unless otherwise specified, all parts and percentages are by weight.

*Example 1.—Transepoxidation with ethylene oxide*

A. A 1.5 liter autoclave was charged with 246 parts (1.437 mole) of 96% 2-hydroxy-3-chloropropyl acrylate, 444 parts (10.1 moles) of ethylene oxide and 1.5 parts of the methyl ether of hydroquinone as a polymerization inhibitor. Then 32 parts of a dry, strong-base anion-exchange resin in chloride form (Dowex 21K resin, 4.5 meq./g. dry resin) was added. The mixture was heated at 90°–103° C. for 2.5 hours with a total pressure of 110–142 p.s.i.g. Samples were withdrawn at intervals and analyzed by vapor phase chromatography. The accompanying figure shows the rate of conversion of 2-hydroxy-3-chloropropyl acrylate into the desired glycidyl acrylate and the formation of by-product 2-chloroethyl acrylate.

In similar runs at temperatures below 90° C., there was no significant formation of 2-chloroethyl acrylate.

B. Similar curves for an identical run except for the use of 3.22 parts of 60% benzyltrimethylammonium chloride solution in place of the resin catalyst are also shown in the figure. It is evident that under similar conditions the resin catalyzed process gives a higher yield of glycidyl acrylate with a decreased amount of undesired 2-chloroethyl acrylate.

*Example 2.—Transepoxidation with epichlorohydrin*

A. To a mixture of 246 parts (1.424 moles) of 95 percent 2-hydroxy-3-chloropropyl acrylate, 1280 parts (13.8 moles) of epichlorohydrin, and 1 part of phenothiazine was added 34.6 parts of a dry strong-base anion-exchange resin in chloride form (Dowex 1 resin, 3.5 meq./g. dry resin). The mixture was heated with stirring at 85° C. for 12.5 hours. Samples of the reaction mixtures were withdrawn at intervals and analyzed by vapor phase chromatography.

B. A similar run using 3.22 parts of a 60% solution of benzyl trimethyl ammonium chloride as the catalyst instead of the exchange resin was made. At 85% conversion of the 2-hydroxy-3-chloropropyl acrylate the undesired by-product was about three times as great in the dissolved catalyst preparation as in the case in which the Dowex resin was used.

*Example 3.—Continuous transepoxidation*

A mixture of 572 parts (3.48 moles) of 2-hydroxy-3-chloropropyl acrylate, 2280 parts (51.7 moles) of ethylene oxide and 2 parts of 2-methyl hydroquinone was passed through a 2 cm. I.D. resin column containing 70.4 parts of dry Dowex 1 resin in chloride form (3.5 meq./g.) with a bed temperature of 90°–100° C. and a contact time of 8.3 minutes. The yield of glycidyl acrylate was 80 percent based on a 89.4 percent conversion of the 2-hydroxy-3-chloropropyl acrylate.

*Example 4.—Acrylic acid-epichlorohydrin*

A. A mixture of 30.2 parts (0.42 mole) of acrylic acid and 370 parts (4.0 moles) om epichlorohydrin was passed through a resin bed containing about 100 parts of dry Dowex 1 resin in chloride form with a bed temperature of 90°–103° C. and a contact time of 4.4 minutes. The product mixture contained 342 parts of epichlorohydrin, 37.0 parts (0.30 mole) 1,3-dichloro-2-propanol, 38.9 parts (0.30 mole) of glycidyl acrylate and 17.4 parts (0.11 mole) of 2-hydroxy-3-chloropropyl acrylate. Based on the glycidyl acrylate only 4.56% of the undesired 1,2-dichloropropyl acrylate was made and the conversion and yield of glycidyl acrylate were 72.8% and 92.2% respectively based on the acrylic acid fed to the column. This mixture is then treated with a mixture of NaOH and $Na_2CO_3$ as in my copending application Ser. No. 341,782, filed Jan. 31, 1964, to convert the 1,3-dichloro-2-propanol to epichlorohydrin, which can then be easily removed by a flash distillation.

B. Other runs similar to Example 2A have been made using a batch process and about 5–10 moles of epichlorohydrin per mole of acrylic acid. Also in the same manner, the strong-base anion-exchange resin in chloride form was found to be a superior catalyst for the preparation of glycidyl methacrylate, glycidyl acetate, and glycidyl benzoate by reaction of the corresponding acids with excess epichlorohydrin.

I claim:

1. In a process for the preparation of a glycidyl ester by the cyclization of the corresponding 2-hydroxy-3-chloropropyl ester through transepoxidation with an alkyl 1,2-epoxide, the improvement which consists essentially in employing a dry strong-base anion-exchange resin in salt form to catalyze the transepoxidation.

2. The process of claim 1 wherein the resin catalyst is in chloride form.

3. The process of claim 2 wherein the alkyl 1,2-epoxide is epichlorohydrin.

4. The process of claim 2 wherein the alkyl 1,2-epoxide is ethylene oxide.

5. The process of claim 2 wherein the glycidyl ester is the glycidyl ester of a $C_3$–$C_6$ ethylenically unsaturated carboxylic acid.

6. The process of claim 2 wherein the glycidyl ester is glycidyl acrylate.

7. The process of claim 2 wherein the glycidyl ester is glycidyl methacrylate.

8. The process of claim 2 wherein the transepoxidation is carried out at 50° to 90° C.

9. In a process for the preparation of a glycidyl ester by reaction of an organic carboxylic acid with excess epichlorohydrin, the improvement which consists essentially in employing a dry strong-base anion-exchange resin in salt form to catalyze the esterification and transepoxidation.

10. The process of claim 9 wherein the glycidyl ester is the glycidyl ester of a $C_3$–$C_6$ ethylenically unsaturated carboxylic acid.

11. The process of claim 9 wherein the glycidyl ester is glycidyl acrylate.

12. The process of claim 9 wherein the glycidyl ester is glycidyl methacrylate.

13. The process of claim 9 wherein the transepoxidation is carried out at 50° to 90° C.

References Cited

UNITED STATES PATENTS

| 2,537,981 | 1/1951 | Edwards | 260—348 |
| 2,756,242 | 7/1956 | Riener | 260—348.6 |
| 2,772,296 | 11/1956 | Mueller | 260—348 |
| 2,864,805 | 12/1958 | Cooke | 260—348.6 XR |
| 2,992,239 | 7/1961 | Neven | 260—348.6 |
| 3,035,018 | 5/1962 | Price et al. | 260—348.6 |
| 3,075,999 | 1/1963 | June | 260—348.6 |
| 3,176,027 | 3/1965 | Budnowski et al. | 260—348.6 |
| 3,178,454 | 4/1965 | Kloos et al. | 260—348.6 |

FOREIGN PATENTS

| 1,280,981 | 11/1961 | France. |
| 1,132,110 | 6/1962 | Germany. |
| 933,594 | 8/1963 | Great Britain. |

OTHER REFERENCES

Bradley et al.: Chemical Soc. Jour., London (1951), pp. 1589–1598.

WALTER A. MODANCE, *Primary Examiner.*

NORMA S. MILESTONE, *Assistant Examiner.*